US010198548B2

(12) United States Patent
Sharma et al.

(10) Patent No.: US 10,198,548 B2
(45) Date of Patent: Feb. 5, 2019

(54) IDENTIFYING THE DEFECTIVE LAYER OF A YIELD EXCURSION THROUGH THE STATISTICAL ANALYSIS OF SCAN DIAGNOSIS RESULTS

(75) Inventors: Manish Sharma, Wilsonville, OR (US); Robert B. Benware, Clackamas, OR (US)

(73) Assignee: Mentor Graphics Corporation, Wilsonville, OR (US)

(*) Notice: Subject to any disclaimer, the term of this patent is extended or adjusted under 35 U.S.C. 154(b) by 137 days.

(21) Appl. No.: 12/918,984

(22) PCT Filed: Feb. 23, 2009

(86) PCT No.: PCT/US2009/034929
§ 371 (c)(1),
(2), (4) Date: Feb. 22, 2011

(87) PCT Pub. No.: WO2009/105785
PCT Pub. Date: Aug. 27, 2009

(65) Prior Publication Data
US 2011/0184702 A1 Jul. 28, 2011

Related U.S. Application Data

(60) Provisional application No. 61/030,556, filed on Feb. 21, 2008.

(51) Int. Cl.
*G06F 17/50* (2006.01)

(52) U.S. Cl.
CPC ...... *G06F 17/5081* (2013.01); *G06F 2217/10* (2013.01)

(58) Field of Classification Search
CPC ............ G01R 31/2851; G01R 31/2846; G01R 31/318342; G01R 31/318511; G03F 7/7065; G06F 2217/10
USPC .......................................... 714/742; 702/185
See application file for complete search history.

(56) References Cited

U.S. PATENT DOCUMENTS

| | | | | |
|---|---|---|---|---|
| 5,825,659 A * | 10/1998 | Nguyen | ............... | G06F 17/5077 716/130 |
| 6,885,955 B1 * | 4/2005 | Atchison | ............ | G01R 31/2894 257/E21.525 |
| 6,931,297 B1 * | 8/2005 | Madge | ................... | G03F 7/7065 700/110 |
| 2001/0018759 A1 * | 8/2001 | Andreev | ............. | G06F 17/5077 716/129 |

(Continued)

OTHER PUBLICATIONS

Bulmer, M. G. "Principles of Statistics." Dover Publication, Inc., New York (1979).*

(Continued)

*Primary Examiner* — Janet Suglo
*Assistant Examiner* — Liam R Casey

(57) ABSTRACT

Yield excursions in the manufacturing process today require an expensive, long and tedious physical failure analysis process to identify the root cause. Techniques are disclosed herein for efficiently identifying the root-cause of a manufacturing yield excursion by analyzing fail data collected from the production test environment. In particular, statistical hypothesis testing is used in a novel way to analyze logic diagnosis data along with information on physical features in the design layout and reliably identify the cause of the yield excursion.

18 Claims, 6 Drawing Sheets

(56) References Cited

U.S. PATENT DOCUMENTS

| | | | |
|---|---|---|---|
| 2004/0032979 A1* | 2/2004 | Honda et al. | 382/145 |
| 2005/0021303 A1* | 1/2005 | Matsushita | G11C 29/006 702/185 |
| 2006/0053357 A1* | 3/2006 | Rajski et al. | 714/742 |
| 2006/0269120 A1* | 11/2006 | Nehmadi et al. | 382/145 |
| 2007/0052963 A1* | 3/2007 | Orbon et al. | 356/430 |
| 2007/0156379 A1* | 7/2007 | Kulkarni et al. | 703/14 |
| 2008/0295048 A1* | 11/2008 | Nehmadi et al. | 716/4 |
| 2009/0055783 A1* | 2/2009 | Florence et al. | 716/4 |
| 2009/0106178 A1* | 4/2009 | Chu | G06N 99/005 706/14 |

OTHER PUBLICATIONS

Martin Keim et al: "A Rapid Yield Learning Flow Based on Production Integrated Layout-Aware Diagnosis" Test Conference, 2006. ITC '06. IEEE International, IEEE, PI, Oct. 1, 2006, pp. 1-10.*

A. Allen "Probability Statistics Queuing Theory", Published by Academic Press, ISBN 10: 0120510502, Publication year: 1978, pp. 515-516.

D. Appello, A. Fudoli, K. Giarda, E. Gizdarski, B. Mathew, V. Tancorre, "Yield Analysis of Logic Circuits", VLSI Test Symposium, 2004. Proceedings. 22nd IEEE, Publication Year: 2004, pp. 103-108.

D. Chieppi, G. De Nicolao, P. Amato, D. Appello, K. Giarda "A New Statistical Algorithm to Enhance Volume Diagnostic Effectiveness and Accuracy", 2006.

H.-P. Erb, C. Burmer, A. Leininger "Yield Enhancement Through Fast Statistical Scan Test Analysis for Digital Logic", in Advanced Semiconductor Manufacturing Conference and Workshop, 2005 IEEE/SEMI Publication Year: 2005, pp. 250-255.

C. Hora, R. Segers, S. Eichenberger, M. Lousberg "An Effective Diagnosis Method to Support Yield Improvement", in Test Conference, 2002. Proceedings. International, Publication Year: 2002, pp. 260-269.

J. Jahangiri and D. Abercrombie "Meeting Nanometer DPM Requirements Through DFT", in Quality of Electronic Design, 2005. ISQED 2005. Sixth International Symposium, Publication Year: 2005, pp. 276-282.

M. Keim, N. Tamarapalli, H. Tang, M. Sharma, J. Rajski, C. Schuermyer, B. Benware "A Rapid Yield Learning Flow Based on Production Integrated Layout-Aware Diagnosis", in Test Conference, 2006. ITC '06. IEEE International, Publication Year: 2006, pp. 1-10.

B. Kruseman, A. Majhi, C. Hora, S. Eichenberger, J. Meirlevede "Systematic Defects in Deep Sub-Micron Technologies", in Test Conference, 2004. Proceedings. ITC 2004. International, Publication Year: 2004, pp. 290-299.

F. Lee, S. Smith "Yield Analysis and Data Management Using Yield Manager™", in Advanced Semiconductor Manufacturing Conference and Workshop, 1998. 1998 IEEE/SEMI, Publication Year: 1998, pp. 19-30.

A. Leininger, P. Muhmenthaler, W.-T. Cheng, N. Tamarapalli, W. Yang, H. Tsai "Compression Mode Diagnosis Enables High Volume Monitoring Diagnosis Flow", in Test Conference, 2005. Proceedings. ITC 2005. IEEE International, Publication Year: 2005, pp. 10-pp. 165.

C. Mack "Pattern Collapse", in Microlithography World, Nov. 2006, pp. 16-17.

R. Minixhofer, D. Rathei "Using TCAD For Fast Analysis of Misprocessed Wafers and Yield Excursions", in Advanced Semiconductor Manufacturing Conference and Workshop, 2005 IEEE/SEMI, Publication Year: 2005, pp. 197-199.

G. Scher, "Wafer Tracking Comes of Age", in Semiconductor International, Product Application Report, Publication Year: 1991, pp. 127-131.

H. Tang, S. Manish, J. Rajski, M. Keim, B. Benware: "Analyzing Volume Diagnosis Results with Statistical Learning for Yield Improvement", in Test Symposium, 2007. ETS '07. 12th IEEE European, Publication Year: 2007, pp. 145-150.

* cited by examiner

CAA: Total open critical area for all nets on a layer
SWS: Minimum width wire with wires at minimum space on both sides

IDENTIFYING THE DEFECTIVE LAYER OF A YIELD EXCURSION THROUGH THE STATISTICAL ANALYSIS OF SCAN DIAGNOSIS RESULTS

RELATED APPLICATIONS

This application is the U.S. National Phase of International Application No. PCT/US2009034929, filed Feb. 23, 2009, which was published in English under PCT Article 21(2), which application claims benefit of U.S. Provisional Patent Application No. 61/030,556, entitled "Identifying The Defective Layer Of A Yield Excursion Through The Statistical Analysis Of Scan Diagnosis Results," filed on Feb. 21, 2008, and naming Robert Benware and Manish Sharma as inventors, which application is incorporated entirely herein by reference.

FIELD OF THE INVENTION

The present invention is directed to the testing, diagnosing, and improving the yield and quality of integrated circuits.

BACKGROUND OF THE INVENTION

The semiconductor manufacturing process has become more sophisticated and expensive with each new technology node. Hence, in order to amortize the cost of fabricated chips, a very high production volume per design is usually required over an extended period of time. During this time of high volume manufacturing, it is common to have unexpected and sudden drops in the yield below normal baseline levels. This phenomenon is commonly referred to as a yield excursion. Yield excursions may happen due to various reasons like changes in fabrication equipment, changes in process parameters etc., and when this happens, it is desirable to quickly identify the source that is causing the yield to drop below normal and fix it.

Sometimes the cause of these excursions can be identified based on wafer histories, analysis of process history, etc. However, in many cases, these methods may not produce an answer. In such cases, one method that is often used is to select a small number of die from a low yielding wafer (which is referred to as an excursion wafer in this disclosure) and determine the defect in the die using physical failure analysis (PFA). However, this is an expensive and time consuming process. Moreover, it can normally be done for only a small number of failing die, which implies that the results may still not be conclusive.

Recently there has been an increasing trend toward analyzing results of logic diagnosis on production test fails in order to identify yield issues. It is desirable to do the same for identifying the cause of yield excursions, as this would help result in an overall cheaper and faster process. The use of diagnosis results to identify and rank systematic yield limiters for a particular design/process has been described in several previous studies. However, these studies are geared towards analyzing large populations, typically consisting of thousands of failing die over several manufacturing lots. Desirably, however, the cause of the yield excursion is determined from a relatively small number of die, typically a few hundred die from a single wafer. Moreover, unlike the scenarios described in previous studies, yield excursions are most commonly caused by a single cause and it is desirable to identify this dominant failing mechanism rather than to identify and rank various systematic yield limiters. For these reasons, conventional analysis techniques are not suitable for dealing with yield excursions.

BRIEF SUMMARY OF THE INVENTION

Representative embodiments of methods, apparatus, and systems having particular applicability to testing, diagnosing, and improving the yield and quality of integrated circuits are disclosed herein that should not be construed as limiting in any way. Instead, the present disclosure is directed toward all novel and nonobvious features and aspects of the various disclosed methods, apparatus, and systems, and their equivalents, alone and in various combinations and subcombinations with one another. The disclosed technology is not limited to any specific aspect or feature, or combination thereof, nor do the disclosed methods, apparatus, and systems require that any one or more specific advantages be present or problems be solved.

Any of the methods, apparatus, and systems described herein can be used in conjunction with the manufacture and testing of a wide variety of integrated circuits (e.g., application-specific integrated circuits (ASICs), programmable logic devices (PLDs) such as a field-programmable gate arrays (FPGAs), or systems-on-a-chip (SoCs)), which utilize a wide variety of components (e.g., digital, analog, or mixed-signal components). The one or more integrated circuits being manufactured and tested can be used in a vast assortment of electronic devices, ranging from portable electronics (such as cell phones, media players, and the like) to larger-scale items (such as computers, control systems, airplanes, automobiles, and the like). All such items comprising integrated circuits analyzed using embodiments of the disclosed technology or equivalents are considered to be within the scope of this disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the figures herein may not show the various ways in which the disclosed methods, apparatus, and systems can be used in conjunction with other methods, apparatus, and systems. Additionally, the description sometimes uses terms like "determine" and "identify" to describe the disclosed technology. These terms are high-level abstractions of the actual operations that are performed. The actual operations that correspond to these terms may vary depending on the particular implementation and are readily discernible by one of ordinary skill in the art.

The disclosed embodiments can be implemented in a wide variety of environments. For example, any of the disclosed techniques can be implemented in whole or in part as software comprising computer-executable instructions stored on one or more computer-readable media (e.g., computer-readable media, such as one or more CDs, volatile memory components (such as DRAM or SRAM), or non-volatile memory components (such as hard drives)). Such software can comprise, for example, an electronic design automation (EDA) software tool (e.g., a failure diagnosis or yield analysis tool). The particular software tools described should not be construed as limiting in any way, however, as the principles disclosed herein are generally applicable to other software tools.

Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer, but can be implemented using any suitable commercially available computer and/or computer language. For the same reason, computer hardware is not described in further detail. Any of the disclosed methods can alternatively be implemented (partially or completely) in hardware (e.g., an ASIC, PLD, or SoC).

Further, data produced from any of the disclosed methods can be created, updated, or stored on one or more computer-readable media (e.g., computer-readable media, such as one or more CDs, volatile memory components (such as DRAM or SRAM), or nonvolatile memory components (such as hard drives)) using a variety of different data structures or formats. For example, diagnostic results generated according to embodiments of the disclosed technology can be stored on one or more computer-readable media. Such data can be created or updated at a local computer or over a network (e.g., by a server computer).

Moreover, any of the disclosed methods can be used in a computer simulation or other EDA environment, wherein test patterns and test responses are determined by or analyzed using representations of circuits, circuit features, wafers, die, and other such components which are stored on one or more computer-readable media. For presentation purposes, however, the present disclosure refers to a circuit or its circuit components by their physical counterpart (for example, vias, layers, wires, nets, and other such terms). It should be understood, however, that any reference in the disclosure or the claims to a physical component includes representations of such components as can be used in simulation or other such EDA environments.

Yield excursions in the manufacturing process today often require an expensive, long and tedious physical failure analysis process to identify the root cause. Various implementations of the invention provide techniques for efficiently identifying the root-cause of a manufacturing yield excursion by analyzing fail data collected from the production test environment. These techniques are sometimes referred to as the "Axiom techniques" or just "Axiom." Embodiments of the disclosed technology utilize statistical hypothesis testing to analyze logic diagnosis data along with information on physical features in the design layout to reliably identify the cause of the yield excursion. Experimental results from an application of an embodiment of the disclosed methodology to a single excursion wafer produced on a 90 nm process are also presented, in which the failing physical feature was correctly identified.

DETAILED DESCRIPTION OF THE INVENTION

Exemplary Operating Environment

Figure 1:
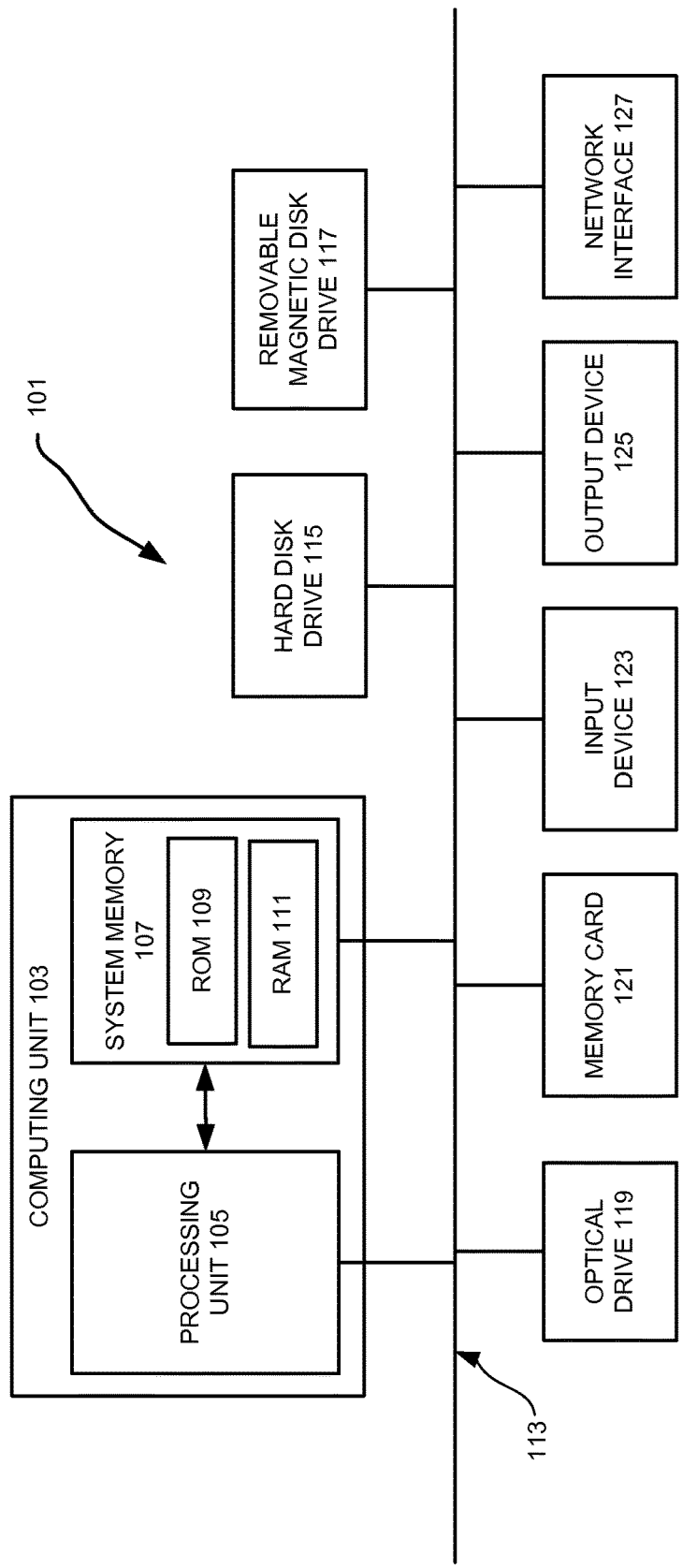
FIG. 1 shows an illustrative example of a computing device that may be employed with various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Exemplary Overall Yield Excursion Analysis Flows

Described herein are embodiments of analysis techniques that allow the use of logic diagnosis results from failing die on the excursion wafer along with information about the physical features from the design layout to identify the cause of the yield excursion. Embodiments of the disclosed methods using diagnosis results to identify the cause of a yield excursion are cheaper, quicker and more accurate than the current state of art techniques, which rely on PFA techniques. Embodiments of the disclosed techniques can be designed to draw conclusions from a small number of failing die and to take advantage of the fact that yield excursions are most likely caused by a single dominant mechanism. Furthermore, embodiments of the disclosed techniques utilize statistical hypothesis testing to reliably identify the cause of the yield excursion.

The disclosed technology is presented in this disclosure through the discussion of an industrial case study. The target design of this case study was a graphics processor chip, which is referred to as GP500. The study focused on an excursion wafer with 209 defective die on it. All these dies had failed structural logic testing, and failure data in terms of the failing test channel and test cycle had been collected for all the failing dies.

For ease of presentation, the discussion in this disclosure is specific to yield excursions due to open defect mechanisms. It should be understood, however, that the techniques are generally applicable to all defect types like bridges, cell internal, etc.

Figure 2:
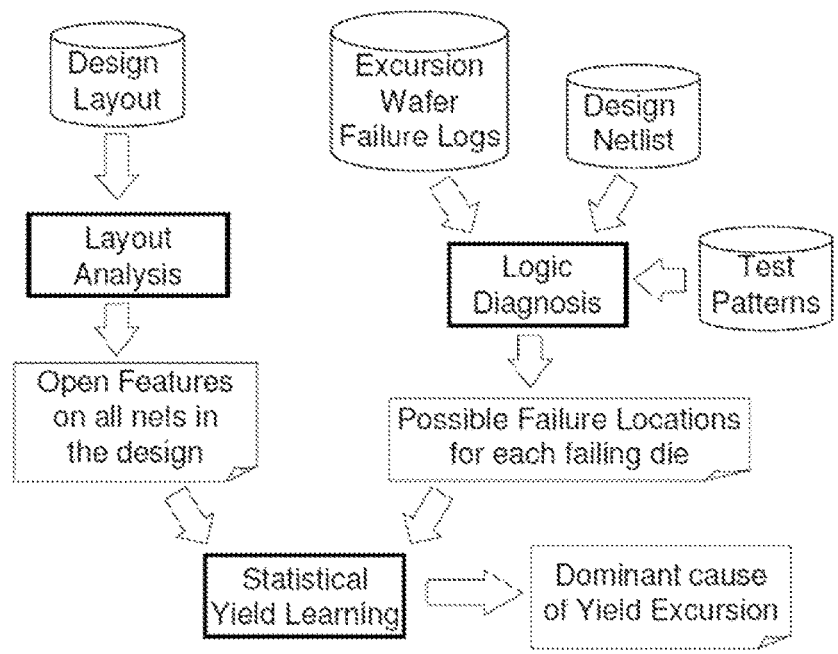
FIG. 2 illustrates an exemplary flow used for performing root cause analysis of yield excursions from manufacturing test data according to one embodiment of the disclosed technology.

FIG. 2 illustrates an exemplary flow used for performing root cause analysis of yield excursions from manufacturing test data according to one embodiment of the disclosed technology.

In this example, the inputs to the flow are the design netlist, the physical layout information, and the fail logs of die from an excursion wafer that failed logic test during production test. The output is analysis results indicating dominant open mechanism causing the yield excursion.

In the example flow of FIG. 2, high volume logic diagnosis of the fail logs is performed to determine logical failing locations for all the failing dies. The design layout information is used to extract layout features that are likely to lead to interconnect opens when defective. These layout features are discussed in detail below. Note that layout feature extraction is a pre-processing step after which the features are stored in a database and the extraction is not repeated for each yield excursion. The two sets of information, diagnosis results and layout features, are then analyzed together using embodiments of the disclosed analysis techniques to determine the dominant open defect mechanism within the set of failing die. This information can then be fed back to the manufacturing process and can lead to the identification of particular process steps that caused the yield excursion. Adjusting the identified process step can then correct the excursion and restore normal yield.

Open Feature Extraction

Figure 3:
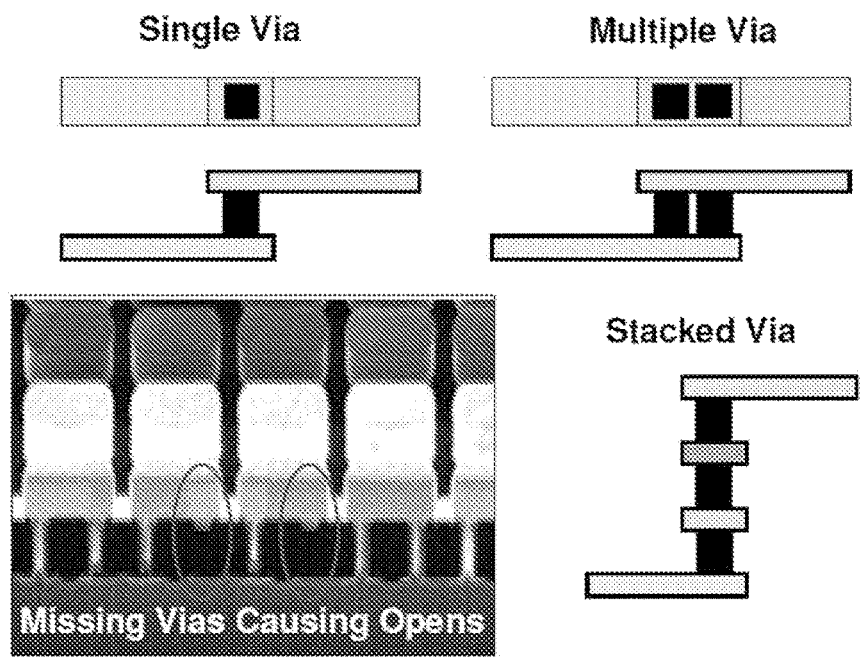
FIG. 3 illustrates various "open" defect features related to vias.
Figure 4:
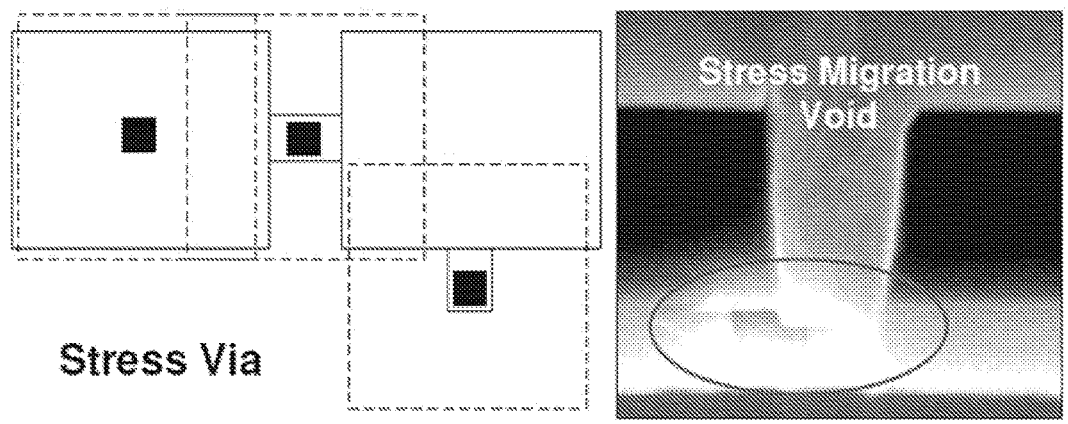
FIG. 4 illustrates example of a stress via open defect feature.
Figure 5:
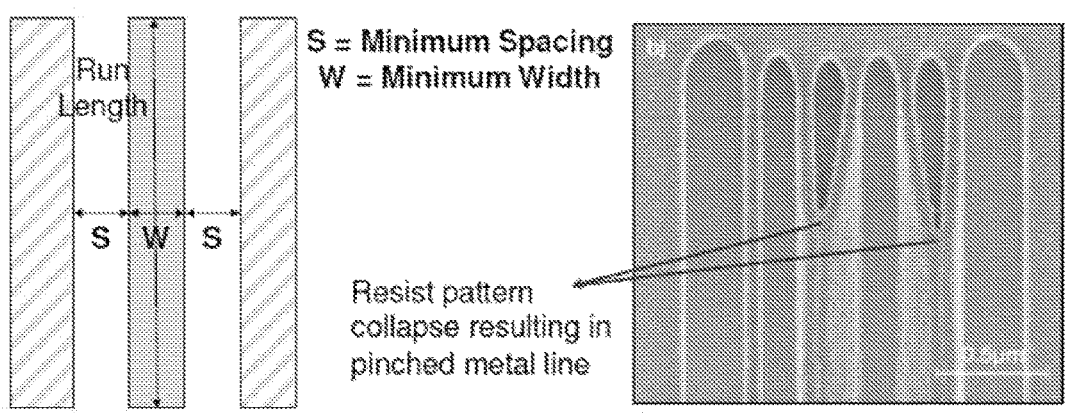
FIG. 5 illustrates an example a SWS open features.

In order to determine the dominant open defect mechanism from the failing nets determined by logic diagnosis, certain embodiments of the disclosed technology extract open features on these nets from the design layout. Open features are layout features on nets that are prone to being mal-formed during chip fabrication, and are most likely to lead to an interconnect open. In certain implementations (along with some common open features like vias (see, e.g., FIG. 3), critical areas of a nets, etc.), the following additional features can be extracted for each net from the design layout:

a. Stacked Vias: In some cases when a net jogs multiple layers (e.g., from metal layer 2 to metal layer 4), a stacked via structure may be used to go directly from the lower metal layer to the upper metal layer (see, e.g., FIG. 3). Such structures are prone to failure in particular because of the tighter tolerance on the alignment of such vias.

b. Stress Vias: In copper based technologies, if a single via is close to or connected to a large piece of metal then such a via is prone to copper stress migration which can lead to voiding (see, e.g., FIG. 4) and hence resistive or complete opens. For purposes of this disclosure, such vias are termed as stress vias and are distinguished from other single vias.

c. Long run minimum width wires with wires at minimum space on both sides (SWS): It has been shown that if there is minimum width metal line, then it is prone to being open due to resist collapse (see, e.g., FIG. 5). To account for this defect mechanism, minimum width wires flanked by wires on both sides at minimum spacing for long run lengths can be identified and this open feature extracted as a total run length for a net under the above condition.

Open Feature Extraction Results

All the above open features were extracted for the target design GP500 in the experimental study that was performed. The outcome of the extraction is a list of open feature type, feature value pairs for each net in the design. The following terminology will be used in this disclosure to denote the various feature types:

| | |
|---|---|
| mi_open | Critical open area on metal layer i |
| mi_sws | SWS open feature on metal layer i |
| single_vi | Single Via from metal layer i to i + 1 |
| multi_vi | Multiple Via from metal layer i to i + 1 |
| mi_vj_stress | Stress via on layer i due to metal layer j |
| stacked_vii+1..i+x | Stacked via going from metal layer i to layer i + x |

Since the design analyzed has 7 metal layers, there are a total of 53 open feature types=(6×4 Via open features)+(15 stacked via types)+(7 critical open areas)+(7 SWS opens).

As discussed above, the feature value for via-related open features was a count of such features on the net. The feature value for a critical open area was the actual critical area determined as described before, and finally, that for a SWS open was the associated run length. The feature value was assumed to be directly proportional to the probability of the net failing due to that feature being defective. The charts in FIGS. 6, 7, and 8 show some basic statistics of the extracted features.

Figure 6:
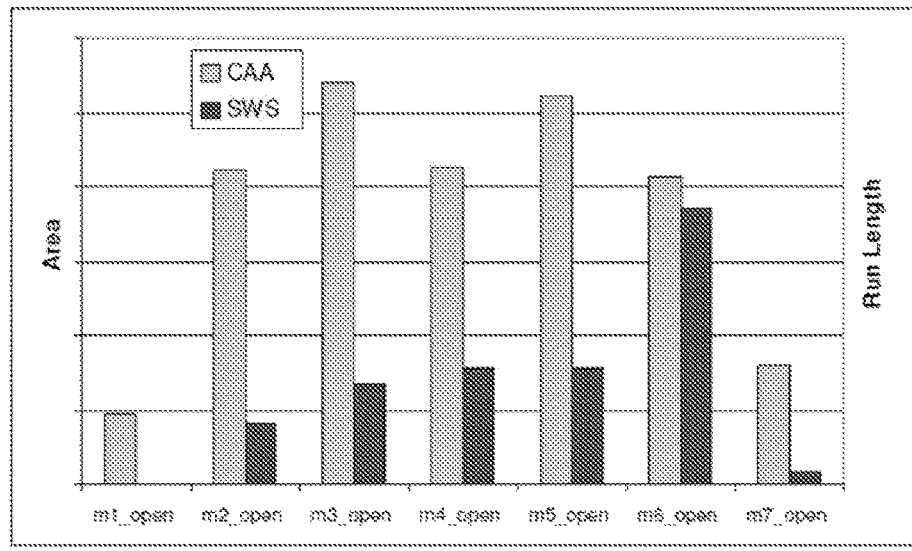
FIGS. 6, 7, and 8 show some basic statistics of extracted features obtained for a failing die during an experimental use of embodiments of the invention.
Figure 7:
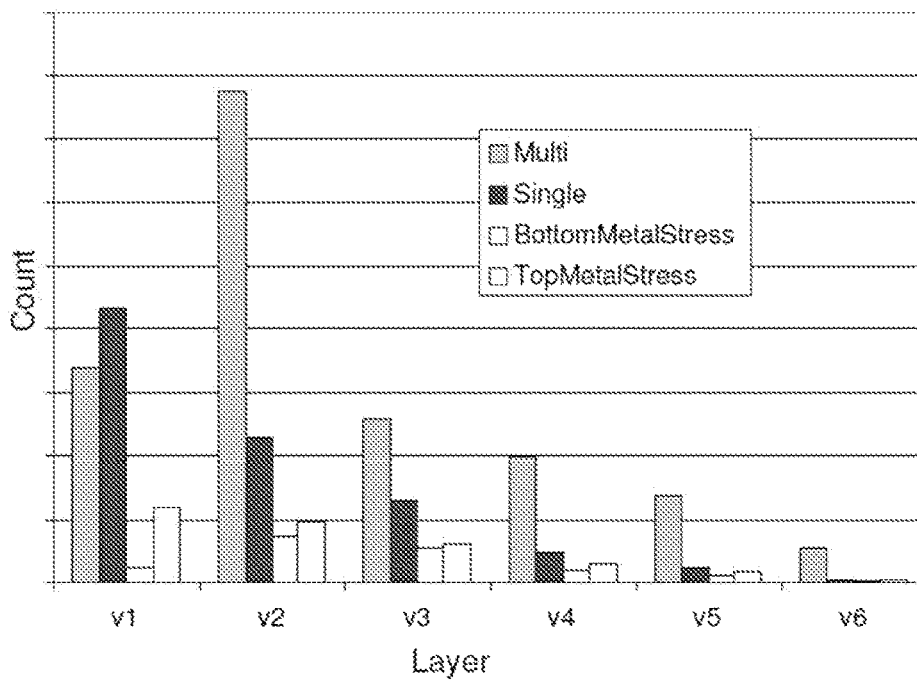

FIG. 6 shows the distribution of critical open area with metal layer and the run length associated with SWS open feature. The chart in FIG. 7 plots the distribution of total counts for various via types in the design with layer. In the chart, the TopMetalStress and BottomMetalStress denote stress vias where the large piece of metal causing stress migration is in the layer above or below the via respectively.

Figure 8:
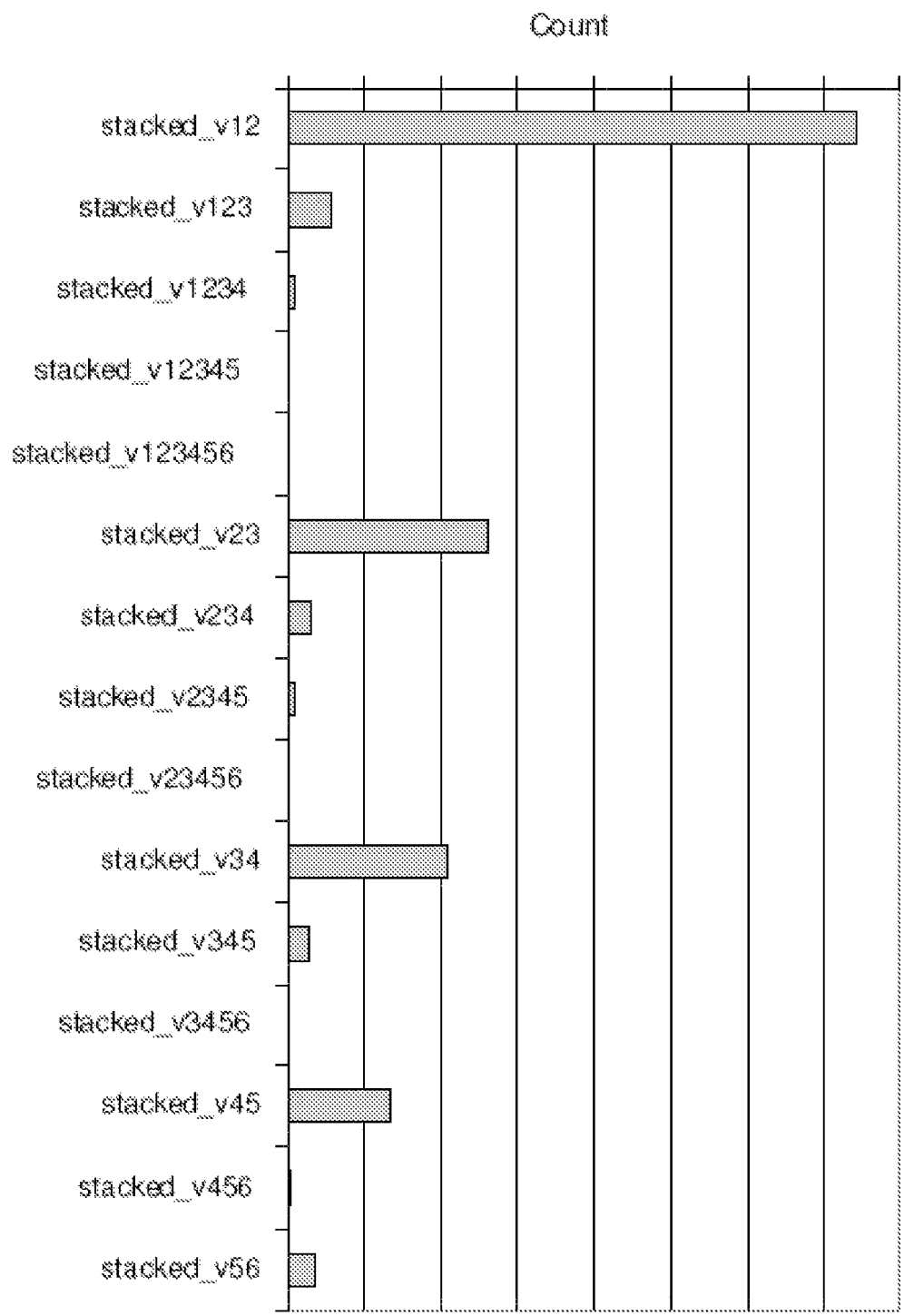

Finally, FIG. 8 shows the counts of stacked vias between various layers in the design. It can been seen that the most common stacked vias in the design were those that connect metal layer i to i+2 (e.g., stacked_v12 connecting metal layers 1 and 3). Other stacked vias are much less common. Since analyses of features that occur rarely in the design produce statistically unreliable results, such features (e.g., stacked vias with very low instance counts) were not considered during yield learning data analysis.

Logic Diagnosis Related Issues

Statistical yield learning from logic diagnosis results presents some unique challenges. This is because logic diagnosis typically produces a list of candidate failing nets, whereas the end goal is the defective open feature. This section addresses some of the challenges in this process.

Typically, logic diagnosis of a fail log from a failing die produces a list of logical nets as candidate failing locations. This means that the actual defect may lie on any of these candidate failing nets. In other words, there is inherent ambiguity in the diagnosis results which can throw off a statistical analysis if not properly addressed. The next section discusses how embodiments of the disclosed analysis technique handle ambiguous diagnosis results.

Logic diagnosis typically produces net level failure location information even though the end goal is open feature level failure information. Hence this information is desirably obtained through statistical population based analysis of open features on failing nets. However, typical nets in a design contain multiple open features, and if two feature types are such that they tend to occur together on the same nets a lot, then it becomes difficult to differentiate among them. As an example in the target design considered in this disclosure, features like single via layer 1 and metal layer 1 critical open area tend to naturally occur together on the same nets. Therefore if statistical data analysis shows more defects in single via layer 1, then the actual problem may also be due to metal layer 1 random particles. Realizing these natural correlations among open features can be important to the analysis technique. In the study described in this disclosure, most of these correlations were found among open features which are within one metal layer of each other.

Previous sections described the various open features extracted for the target design, GP500, as well as the main challenges in analyzing the failing location data obtained from logic diagnosis. This section describes embodiments of the disclosed analysis technique that can be used to identify the dominant failure mechanism in the given set of failing die from an excursion wafer by analyzing their logic diagnosis results along with the extracted physical features.

As mentioned before, embodiments of the disclosed technique are based on statistical hypothesis testing, so this discussion begins with a brief description of such testing. Statistical hypothesis testing is a method to draw conclusions from a given set of data. A null hypothesis is created, which is basically something that one would want to disprove using the given data set. As an example, using the diagnosis data, one would like to disprove all those features as the dominant defect mechanism which are not so in reality. Following the creation of a null hypothesis, a statistical test is performed on the data set based on this hypothesis. A variety of statistical tests are known; in this disclosure, the chi-square test is used since it is the least restrictive, though other suitable tests can also be used. The chi-square test returns a probability value, commonly referred to as the p-value. If this p-value is less than a constant $\alpha$ (where $0 \le \alpha \le 1$ and the actual value of $\alpha$ is one minus the desired confidence level from the test) then the null hypothesis can be rejected (or disproved) with a probability equal to $1-\alpha$. On the other hand if the p-value is greater than $\alpha$, then it can be said that there is not enough statistical evidence to disprove the null hypothesis with the desired confidence level.

Based on the above discussion, an exemplary embodiment of an analysis technique can be described:

a. Receive (or load) logic diagnosis results of a set of failing die and a list of open physical features along with their values on each net in the design (Recall that the value of a feature on a net for vias is the count, for a critical area the value is the area, and for a SWS open the value is the run length). The goal is to identify the dominant defect mechanism from among these features.

b. Analyze one or more of the open features (e.g., analyze each open feature one at a time). When analyzing an open feature, form the null hypothesis that this feature is the sole defect mechanism.

c. Perform the chi-square statistical test to determine the p-value for the above null hypothesis. This can be done by matching the expectations generated by the null hypothesis against the actual diagnosis data.

d. If the p-value calculated in the above act is small, then the null hypothesis can be rejected with high confidence, which would mean that the current feature is not a dominant defect mechanism. The feature that passes the chi-square test with the highest p-value can be identified as the most dominant defect mechanism.

Of particular note in the above procedure is the act of matching the expected data against actual data. This procedure should be such that it can handle the ambiguity in diagnosis results (as discussed above). One exemplary procedure that accomplishes this comprises one or more of the following method acts:

a. Let $ft_i$ denote the open feature that is currently being analyzed. Let NETS denote the set of all the nets in the design.

b. Sort the nets in the design in descending order of the value of feature $ft_i$ on the net.

c. Divide NETS into N equal groups (where N is some fixed constant): $Gp_1, Gp_2, \ldots, Gp_N$, such that the top |NETS|/N nets as ordered in the previous step go into group $Gp_1$, the next |NETS|/N nets according to the ordering above go into $Gp_2$ and so on. Therefore by construction, the value of the feature $ft_i$ summed over all the nets in $Gp_1$ will be the highest among all the groups and it will continuously decrease as the procedure goes from $Gp_1$ to $Gp_N$.

d. Based on the hypothesis that $ft_i$ is the sole failure mechanism; calculate an expected diagnosed count for each of the N net groups. The diagnosed count for a net group is defined as the total number of times a net in the group is included as one of the candidate failing nets in a diagnosis report.

e. Calculate the actual diagnosed count for each of the N net groups from the diagnosis reports. This can be done, for example, by going through each candidate failing net in all the diagnosis reports and incrementing the diagnosed count of the group to which the net belongs.

f. Regarding the diagnosed counts for the net groups as independent measurements, perform hypothesis testing by doing a chi-square analysis on the expected and actual values.

One feature of this exemplary procedure is the act of dividing the nets into several groups distinguished by the feature values on the nets. This allows for the computation of expected and actual values, which in turn enables statistical testing. Conceptually, the exemplary approach can be understood as follows: assume that some yield excursion is caused by the presence of excessive impurity particles during a metal layer 4 fabrication step. This would mean that the dominant failing feature is m4_open (critical area on metal layer 4). Therefore, in this case, nets with a high value of m4_open would tend to fail and show up in the diagnosis reports more often. In other words the actual diagnosed count for net groups should better track the total value of the feature m4_open as opposed to the total value of any other feature.

To calculate the expected diagnosed count for net groups, the following procedure is used in certain implementations of the disclosed technology. For purposes of this discussion, the expected diagnosed count for a group will be denoted by $Exp_{diagn}(Gp_i)$. As mentioned before, the expected diagnosed count for a net group, $Gp_i$, is the number of times one would expect to see nets from $Gp_i$ in the diagnosis reports given that the null hypothesis is true. Now, since the null hypothesis states that the sole failing mechanism is the feature, $ft_i$, being currently processed, the rate at which this feature must fail can be determined given the hypothesis as below:

$$p_{fail}(ft_i) \approx \frac{\text{Number of failing die}}{DIE_{total} \times \sum_{All\ Nets} v(ft_i)}$$

In the above equation $p_{fail}(ft_i)$ denotes the fail rate of feature $ft_i$, $v(ft_i)$ denotes the value of that feature on a net and $DIE_{total}$ denotes the total number of manufactured die (total number of die on the excursion wafer). Hence, this equation basically states that the fail rate of the feature can be estimated as the ratio of number of times it fails to the total number of times it is fabricated. Note that here it is assumed (for the sake of simplicity) that there is one defect per failing die. From the feature fail rate as determined above, the number of times some net in a group is expected to fail can be determined. For example, the following equations can be used:

$$Exp_{fail}(Gp_i) = \left[DIE_{total} \times \sum_{Nets\ in\ Gp_i} v(ft_i)\right] \times p_{fail}(ft_i)$$

$$Exp_{fail}(Gp_i) = \left[\frac{\sum_{Nets\ in\ Gp_i} v(ft_i)}{\sum_{All\ Nets} v(ft_i)}\right] \times \text{Number of failing die}$$

In the above expression, $Exp_{fail}(Gp_i)$ is the expected fail count of the net group $Gp_i$.

It is also desirable to account for noise due to ambiguity in diagnosis results to determine the expected diagnosed count for a group $Gp_i$. The diagnosis noise can be estimated, in one exemplary embodiment, by assuming that the diagnosis report always includes the real failing nets, and the remaining candidates belong to random groups. In other words, it can be assumed that all the candidate nets in the diagnosis reports besides the real failing nets (i.e. diagnosis noise) are spread evenly over all the groups. Since the net groups are of equal size by construction, the diagnosis noise for a group can be estimated by:

$$Diag_n = \frac{\left(\text{Total candidate net count in diagnosis reports} - \text{Number of failing die}\right)}{N}$$

In the above expression, $Diag_n$ denotes diagnosis noise. With the estimation of diagnosis noise, the expected diagnosed count for a group can be determined as below:

$$Exp_{diagn}(Gp_i) = Exp_{fail}(Gp_i) + Diag_n$$

Figure 9:
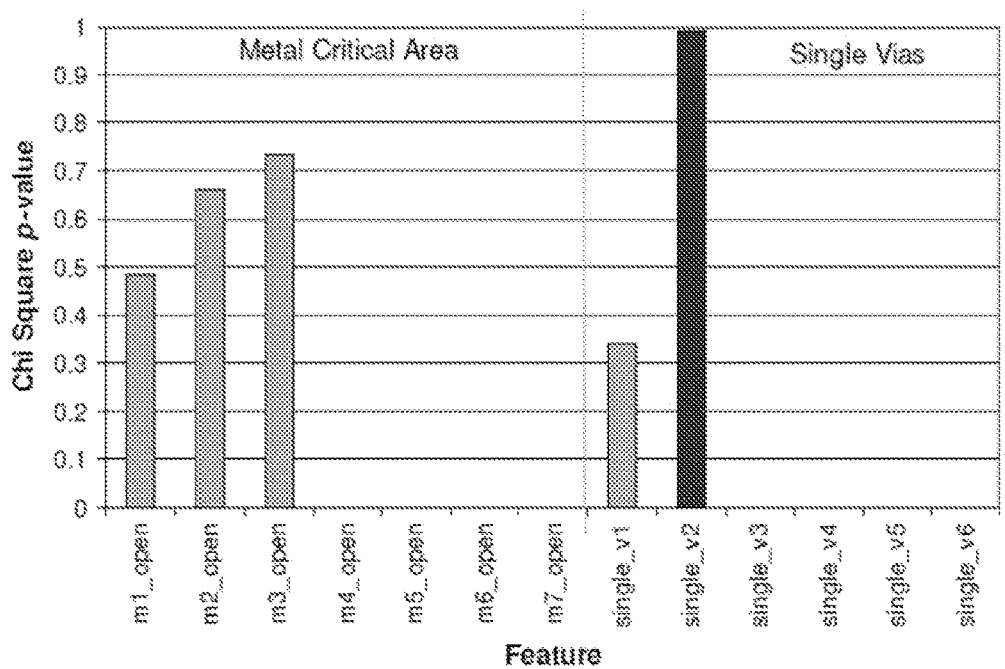
FIG. 9 illustrates the weighted proportion of failing features for basic feature types obtained from an analysis of a failing die according to various embodiments of the invention.

Recall that the target of the experimental study was an excursion wafer whose yield was much below normally yielding wafers of the same design. The target excursion wafer had 209 failing die on it. Fail logs from these failing die were input into a logic diagnosis tool to determine the most likely failing locations or nets for each failing die. This failing nets data along with the open features extracted for each net were then analyzed together using the exemplary embodiment of the analysis technique described in the previous section. In these experiments, the focus was on the main open features, i.e. the single vias on each layer and critical open area for all metal layers. Furthermore N=20 net groups for these experiments. The results of the analysis are plotted in the chart in FIG. 9. This chart plots the p-values for each feature type in the design as calculated by the exemplary embodiment of the analysis technique described above.

One observation that can be made from the chart is that the following features have very low p-values, and hence can be removed from the list of possible suspects with a high confidence: critical open area on metal layers 4 and above and single vias on layer 3 and above. This leaves m1_open, m2_open, m3_open, single_v1 and single_v2 as the possible causes. Among these, single_v2 stands out with the highest p-value. This indicates single vias on layer 2 could be the dominant fail mechanism. However, if that is the case, why are there such high p-values for the other four features? This can be attributed to the issue of correlation among open features as discussed above. It is very likely that nets that contain single_v2 also contain the features single_v1, m1_open, m2_open and m3_open. This is the likely reason behind getting high p-values for these features. Notwithstanding these correlation effects, 9 indicates that the exemplary embodiment of the disclosed analysis technique is able to make a clear distinction between single_v2 and the other high p-value features, indicating that this feature is the most dominant failure mechanism. In the next section, the independent validation of this result through the traditional PFA based methodology is discussed.

It should be noted that without the statistical analysis, it would not ordinarily be possible to determine single_v2 vias as the highest failing features. For example, if only the total number of failing features in diagnosis reports were counted, single_v1 would be identified as the highest failing feature. Moreover, it can be seen from FIG. 7 that the number of single_v2's in the design is much lower that multi_v1, multi_v2, single_v1 etc. Hence, from the diagnosis results, it can be concluded that the cause of the yield excursion is most likely an abnormality in a process step related to the fabrication of single vias layer 2. This information can be used to identify and subsequently correct the deviant process step and hence restore the yield back to normal levels.

Validating the Conclusions Drawn from Analysis of the Diagnosis Results

Figure 10:
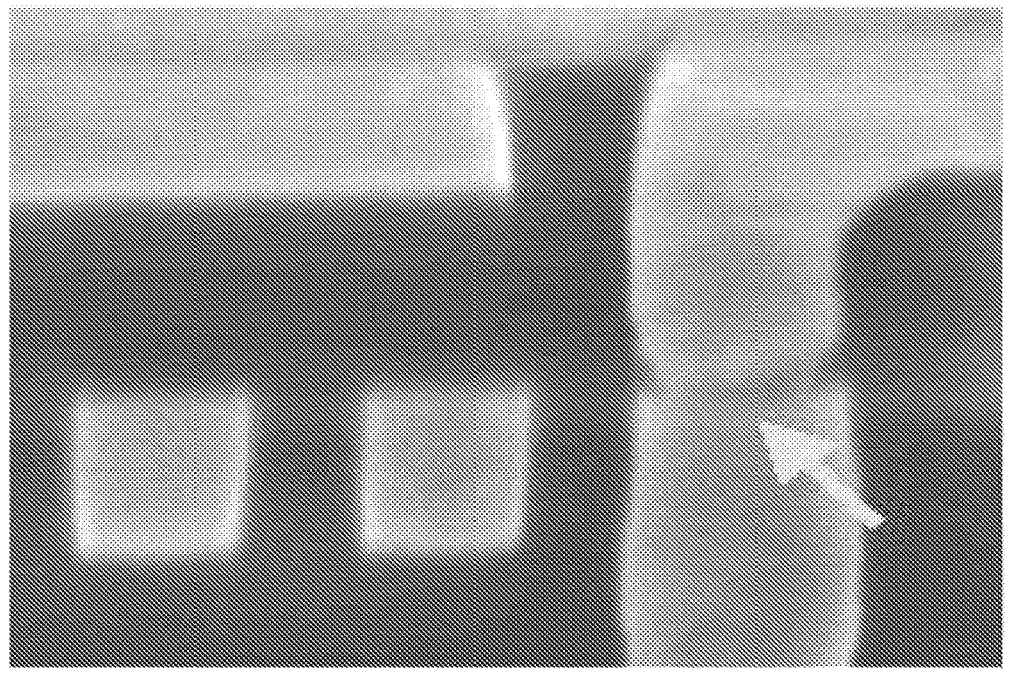
FIG. 10 illustrates a defective via.

In order to validate that single vias on v2 are indeed the dominant failing feature in the defective die on the excursion wafer, eight failing die were selected for performing detailing physical failure analysis (PFA) of the defects. These die were selected based on the ease of isolating the defect based on diagnosis results and data from probing equipment etc. The PFA process on all eight selected dies isolated the defect to a mal-formed layer 2 via which was leading to an open net in the device. The PFA picture of one such defective via is show in FIG. 10. Hence, these PFA results provide independent validation of the analysis techniques presented in the previous sections.

Further analysis determined that all these defective vias had a thin oxide layer on the bottom which was leading to the net open. Once this information was fed back to the manufacturing process, it was determined that one of the metal deposition steps was unclean leading to higher failures. Having a tighter particle control on this step resulted in yields getting back to normal.

Using diagnosis results to identify the dominant defect mechanism among failing die on an excursion wafer according to certain embodiments disclosed herein is a much cheaper and faster diagnostic technique than conventional PFA. Further advantages that can be realized using embodiments of the disclosed technology are that the techniques can be used to analyze all the failing dies, which means that statistically significant conclusions can be drawn from the data. With today's fabrication processes becoming very complex and expensive, combined with very high volume manufacturing, it is desirable to manage yield excursions as quickly and efficiently as possible. This disclosure presented exemplary embodiments of analysis techniques based on the analysis of logic diagnosis results for failing die. Embodiments of the disclosed techniques are specifically designed to perform analysis for excursion wafers and are able to handle inherent ambiguity in logic diagnosis. Experimental results showed that an exemplary implementation of the disclosed technology was able to overcome the problem of correlation among features in a design.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method of dominant defect mechanism identification, comprising:
by a computer:
receiving test results for one or more dies using a logic diagnosis process, which includes using wafer failure log data, design netlist data for a circuit design, and test pattern data for the dies, to indicate candidate logical failing nets in the circuit design;
partitioning nets in the circuit design into equal net groups, each net group having a plurality of feature values corresponding to a plurality of physical features for the nets based on the design netlist data, each physical feature representing a likely defect;
ordering the net groups in descending order based on the plurality of feature values and a currently selected physical feature;
deriving actual diagnosed counts for the net groups, wherein the actual diagnosed counts are defined as a number of times the candidate logical failing nets are identified by the logic diagnosis process;
deriving expected diagnosed counts for the net groups based on the feature values for the net groups;
performing statistical analysis of the actual diagnosed counts and the expected diagnosed counts for the ordered net groups based on the selected physical feature;
identifying at least one of the physical features as a dominant defect mechanism in one or more of the tested dies based on the statistical analysis;
feeding the dominant defect mechanism back into a manufacturing process;
identifying a particular manufacturing process step as a cause of yield excursion based on the identified physical feature; and
adjusting the particular manufacturing process step to restore normal yield.

2. The method recited in claim 1, wherein the partitioning leads to an equal number of nets in each of the net groups.

3. The method recited in claim 1, wherein the physical feature is an open feature and the feature values are counts of the physical feature on the nets.

4. The method recited in claim 1, wherein the deriving expected diagnosed counts comprises:
deriving expected failing counts for the net groups based on the feature values;
assigning diagnosis noise counts for the net groups; and
obtaining the expected diagnosed location counts by adding the diagnosis noise counts to the expected failing counts.

5. The method recited in claim 4, wherein the deriving expected failing counts comprises:
calculating feature ratios by dividing a sum of the features values for each of the net groups by a sum of the feature values for all of the net groups; and
deriving expected failing counts based on the feature ratios and the number of the failing dies.

6. The method recited in claim 1, wherein the statistical analysis is a chi-square test.

7. A non-transitory processor-readable medium storing processor-executable instructions for causing one or more processors to perform a method of dominant defect mechanism identification, the method comprising:
receiving logic diagnosis data of failing dies fabricated based on a circuit design, the logic diagnosis data including information indicative of candidate logical failing nets in the circuit design, the logic diagnosis data being generated by a logic diagnosis process that identifies the candidate logical failing nets from failure logs produced from logic tests applied during production testing of the failing dies;
partitioning nets in the circuit design into net groups and ordering the net groups based on open feature values for an open feature type of a physical feature for the nets, the physical feature representing a likely open feature defect mechanism;
deriving actual diagnosed location counts for the net groups, an actual diagnosed net count for one net group being a number of times the candidate logical failing nets identified by the logic diagnosis process appear in the one net group;

deriving expected diagnosed net counts for the net groups based on the feature values of the physical feature for the net groups;

performing statistical analysis of the actual diagnosed net counts and the expected diagnosed nets counts for the ordered net groups to identify the physical feature as a dominant defect mechanism in one or more of the tested dies;

feeding the dominant defect mechanism back into a manufacturing process;

identifying a particular manufacturing process step as a cause of yield excursion based on the identified physical feature; and adjusting the particular manufacturing process step based to restore normal yield.

8. The non-transitory processor-readable medium recited in claim 7, wherein the feature values are counts of the physical feature on the nets.

9. The non-transitory processor-readable medium recited in claim 7, wherein the deriving expected diagnosed net counts comprises:

deriving expected failing counts for the net groups based on the feature values;

assigning diagnosis noise counts for the net groups; and obtaining the expected diagnosed net counts by adding the diagnosis noise counts to the expected failing counts.

10. The non-transitory processor-readable medium recited in claim 9, wherein the deriving expected failing counts comprises:

calculating feature ratios by dividing a sum of the features values for each of the net groups by a sum of the feature values for all of the net groups; and deriving expected failing counts based on the feature ratios and the number of the failing dies.

11. The non-transitory processor-readable medium recited in claim 7, wherein the statistical analysis is a chi-square test.

12. A system comprising one or more processors, the one or more processors programmed to perform a method of dominant defect mechanism identification, the method comprising:

receiving logic diagnosis data of failing dies fabricated based on a circuit design, the logic diagnosis data including information indicative of candidate logical failing locations in the circuit design, the logic diagnosis data being generated by a logic diagnosis process that identifies the candidate logical failing locations from failure logs produced from logic tests applied during production testing of the failing dies;

dividing a plurality of nets in the circuit design into equal net groups and sorting the nets based on feature values of a physical feature determined for each net group, the physical feature representing a likely defect mechanism associated with a proneness of the respective physical feature to an interconnect open during chip fabrication;

deriving actual diagnosed location counts for the net groups, an actual diagnosed location count for one net group being a number of times the candidate logical failing locations identified by the logic diagnosis process appear in the one net group;

deriving expected diagnosed location counts for the net groups based on the feature values of the physical feature for the net groups;

performing statistical analysis of the actual diagnosed location counts and the expected diagnosed locations counts for the sorted net groups to identify physical feature as a dominant defect mechanism;

feeding the dominant defect mechanism back into a manufacturing process;

identifying a particular manufacturing process step as a cause of yield excursion based on the identified physical feature; and adjusting the particular manufacturing process step to restore normal yield.

13. The system recited in claim 12, wherein the actual diagnosed location counts are actual diagnosed net counts, and the expected diagnosed location counts are expected diagnosed net counts.

14. The system recited in claim 13, wherein the physical feature is an open feature and the feature values are counts of the physical feature on the nets.

15. The system recited in claim 12, wherein the deriving expected diagnosed location counts comprises:

deriving expected failing counts for the net groups based on the feature values;

assigning diagnosis noise counts for the net groups; and obtaining the expected diagnosed location counts by adding the diagnosis noise counts to the expected failing counts.

16. The system recited in claim 15, wherein the deriving expected failing counts comprises:

calculating feature ratios by dividing a sum of the features values for each of the location groups by a sum of the feature values for all of the net groups; and deriving expected failing counts based on the feature ratios and the number of the failing dies.

17. The system recited in claim 12, wherein the statistical analysis is a chi-square test.

18. The non-transitory processor-readable medium recited in claim 7, wherein the open feature type is one of the following: stacked vias, stress vias, or critical areas of long run width wires.

* * * * *